US006832096B2

(12) United States Patent
Haim

(10) Patent No.: US 6,832,096 B2
(45) Date of Patent: *Dec. 14, 2004

(54) FAST ADAPTIVE POWER CONTROL FOR A VARIABLE MULTIRATE COMMUNICATIONS SYSTEM

(75) Inventor: John W. Haim, Baldwin, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 80 days.

This patent is subject to a terminal disclaimer.

(21) Appl. No.: 10/077,449

(22) Filed: Feb. 15, 2002

(65) Prior Publication Data

US 2002/0102944 A1 Aug. 1, 2002

Related U.S. Application Data

(63) Continuation of application No. 09/904,001, filed on Jul. 12, 2001, and a continuation of application No. 09/904,020, filed on Jul. 12, 2001.
(60) Provisional application No. 60/223,375, filed on Aug. 7, 2000, and provisional application No. 60/221,348, filed on Jul. 26, 2000.

(51) Int. Cl.[7] .............................. H04B 7/00; H04Q 7/20
(52) U.S. Cl. ........................ 455/522; 455/39; 455/67.1; 455/69; 370/310; 370/391
(58) Field of Search ........................... 455/39, 67.1, 69, 455/522, 517, 561, 504; 370/310, 391, 343, 468

(56) References Cited

U.S. PATENT DOCUMENTS

| 5,528,593 | A | * | 6/1996 | English et al. ................ 370/84 |
| 5,621,723 | A | * | 4/1997 | Walton, Jr. et al. ........... 370/18 |
| 5,812,938 | A | * | 9/1998 | Gilhousen et al. ............ 455/69 |
| 6,067,458 | A | * | 5/2000 | Chen ........................... 455/522 |

| 2002/0102944 | A1 | 8/2002 | Haim |
| 2002/0115468 | A1 | 8/2002 | Haim |
| 2002/0144019 | A1 | 10/2002 | Nelson et al. |
| 2003/0040342 | A1 | 2/2003 | Coan et al. |
| 2003/0054851 | A1 | 3/2003 | Jo et al. |
| 2003/0083089 | A1 | 5/2003 | Malladi |
| 2003/0092459 | A1 | 5/2003 | Blessent |

FOREIGN PATENT DOCUMENTS

WO        97/18643 A     5/1997

OTHER PUBLICATIONS

3rd Generation Partnership Project, Technical Specification Group Radio Access Network, Multiplexing and channel coding (TDD), TS 25.222 V3.6.0, 2001.
3rd Generation Partnership Project, Technical Specification Group Radio Access Network, Spreading and modulation (TDD), TS 25.223 V3.5.0, 2001.

(List continued on next page.)

Primary Examiner—Lester G. Kincaid
Assistant Examiner—Joy K. Contee
(74) Attorney, Agent, or Firm—Volpe and Koenig, P.C.

(57) ABSTRACT

A system and a method of controlling transmitter power in a wireless communication system in which user data is processed as a multirate signal having a rate N(t) and in which the user data signal having rate N(t) is converted into a transmission data signal having a faster rate M(t) for transmission. The transmission power is adjusted on a relatively slow basis based on quality of data received by a receiver of the transmitted data. The transmitter power is determined as a function of N(t)/M(t) such that a change in the data rate in the multiple channels or the rate of the transmission data signal is compensated in advance of a quality of data based adjustment associated with such data rate change. Preferably, the user data signal having rate N(t) is converted into the transmission data signal having the faster rate M(t) by repeating selected data bits whereby the energy per bit to noise spectrum density ratio is increased in the transmission data signal.

18 Claims, 7 Drawing Sheets

OTHER PUBLICATIONS

3rd Generation Partnership Project, Technical Specification Group Radio Access Network, Physical Layer Procedures (TDD), TS 25.224 V3.6.2, 2001.

Association of Radio Industries and Businesses (ARIB), vol. 3, Specification of Air–Interface for 3G Mobile Systems, Version 1.0, Jan. 14, 1999.

* cited by examiner

ID: 6,832,096 B2

FAST ADAPTIVE POWER CONTROL FOR A VARIABLE MULTIRATE COMMUNICATIONS SYSTEM

CROSS-REFERENCE TO RELATED APPLICATIONS

This application is a continuation of U.S. patent application Ser. No. 09/904,001, filed Jul. 12, 2001 and U.S. patent application Ser. No. 09/904,020, filed Jul. 12, 2001, which in turn claim priority from U.S. Provisional Patent Application No. 60/221,348, filed Jul. 26, 2000, and from U.S. Provisional Patent Application No. 60/223,375, filed Aug. 7, 2000, all of which are incorporated herein by reference.

FIELD OF THE INVENTION

The present invention relates to power control for wireless communication systems and, in particular, fast adaptive power control system and methods for a variable multirate communication system.

BACKGROUND

Various methods of power control for wireless communication systems are well known in the art. An example of an open loop power control transmitter system for a single rate data system is illustrated in FIG. 1. An example of a closed loop power control transmitter system for a single rate data is illustrated in FIG. 2.

The purpose of both systems is to rapidly vary transmitter power in the presence of a fading propagation channel and time-varying interference to minimize transmitter power while insuring that data is received at the remote end with acceptable quality. Typically, in a digital implementation, transmitter power is varied by applying a varying scale factor to the digital data, as opposed, for example, to varying the gain of an RF amplifier.

In state-of-the-art communication systems such as Third Generation Partnership Project (3GPP) Time Division Duplex (TDD) and Frequency Division Duplex (FDD) systems multiple channels of variable rate data are combined for transmission. FIGS. 3 and 4 represent prior art open and closed power control transmission systems, respectively. Background specification data for such systems are found at 3GPP TS 25.223 v3.3.0, 3GPP TS 25.222 v3.2.0, 3GPP TS 25.224 v3.6 and Volume 3 specifications of Air-Interface for 3G Multiple System Version 1.0, Revision 1.0 by the Association of Radio Industries Businesses (ARIB).

Such open and closed loop power control systems for variable multirate wireless communications systems respond relatively slowly to data rate changes, resulting in sub-optimal performance such as relating to excessive transmitter power and below-quality received signals. It would be desirable to provide a fast method and system of power control adaption for data rate changes resulting in more optimal performance.

SUMMARY

The invention provides a method of controlling transmitter power in a wireless communication system in which user data is processed as a multirate signal having a rate $N(t)$ and in which the user data signal having rate $N(t)$ is converted into a transmission data signal having a faster rate $M(t)$ for transmission. The transmission power is adjusted on a relatively slow basis based on quality of data received by a receiver of the transmitted data. The transmitter power is determined as a function of $N(t)/M(t)$ such that a change in the data rate in the user data signal or the rate of the transmission data signal is compensated for in advance of a quality of data based adjustment associated with such data rate change. Preferably, the user data signal having rate $N(t)$ is converted into the transmission data signal having the faster rate $M(t)$ by repeating selected data bits whereby the energy per bit to noise spectrum density ratio is increased in the transmission data signal.

The method is applicable in either an open or closed power control system where a scale factor is applied to control transmitter power. In implementing the invention in a transmitter of either an open or closed system, preferably $\sqrt{(N(t)/M(t))}$ is applied to the scale factor.

The method is applicable to an open loop power control system where the transmitter receives a reference signal, reference signal power data, measured interference power data, and target signal to interference ratio (SIR) data which SIR data is based on relatively slowly collected received signal quality data. The transmitter measures the reference signal to determine received reference signal power and computes a path loss based on the received reference signal power data and the determined reference signal power. The transmitter then computes the scale factor based on the computed path loss, the received measured interference power data, the target SIR data and $\sqrt{(N(t)/M(t))}$.

The method is also applicable to a closed loop system where the transmitter utilizes step up/down data generated by the receiver and computes the scale factor based on the step up/step down data and $\sqrt{(N(t)/M(t))}$. Preferably, the step up/down data is generated by the receiver by combining measured interference power data of the signal received from the transmitter with target signal to interference ratio (SIR) data based at least in part on relatively slowly collected received signal quality data. The target SIR data is preferably computed by multiplying a nominal target SIR data based on relatively slowly collected received signal quality data by a factor $N(t)/M(t)$ so that the target SIR data is quickly adjusted when a change in data rate occurs.

The invention also provides a transmitter for a wireless communication system in which user data is processed as a multirate signal having a rate $N(t)$ and in which the user data signal having rate $N(t)$ is converted into a transmission data signal having a faster rate $M(t)$ for transmission. The transmitter transmission power is adjusted on a relatively slow basis by applying a scale factor to the transmitter power based on quality of data received by a receiver of the transmitted data. The transmitter includes a data signal rate converter which increases the user data signal rate $N(t)$ to a higher data transmission rate $M(t)$ and a processor for computing a transmission power scale factor based in part on data generated by the receiver related to quality of data received. The data signal rate converter is associated with the processor such that the processor computes the transmission power scale factor as a function of $N(t)/M(t)$ whereby a change in the data rate in the user data signal or the rate of the transmission data signal is compensated for in advance of a receiver quality of data based adjustment associated with such data rate change.

Preferably, the data signal rate converter converts the user data signal having rate $N(t)$ into the transmission data signal having the faster rate $M(t)$ by repeating selected data bits whereby the energy per bit to noise spectrum density ratio is increased in the transmission data signal.

The transmitter is configurable as part of an open loop power control system where the transmitter receives from the receiver of the transmitted data: a reference signal, reference signal power data, measured interference power data, and target signal to interference ratio (SIR) data which SIR data is based on relatively slowly collected received signal quality data. As such, the transmitter includes a signal measuring device which measures received reference signal power and path loss processing circuitry for computing a path loss based on the received reference signal power data and the measured received reference signal power. The transmitter processor computes the transmission power scale factor based on the computed path loss, the received measured interference power data, the target SIR data and $\sqrt{(N(t)/M(t))}$.

The transmitter is also configurable as part of a closed loop power control system where the transmitter receives step up/down data from the receiver of the transmitted data. As such, the transmitter processor computes the transmission power scale factor based on the received step up/step down data and $\sqrt{(N(t)/M(t))}$.

The invention also provides a closed loop transmission power control system for a wireless communication system in which user data is processed as a multirate signal having a rate N(t), in which the user data signal having rate N(t) is converted into a transmission data signal having a faster rate M(t) for transmission and in which the transmission power is adjusted by applying a scale factor in response to step up/down data. The system includes a receiver which receives the M(t) rate transmission data signal and generates the step up/down data. The receiver preferably has a data signal rate converter which decreases the data rate of received transmission data M(t) to produce a user data signal having a lower data rate N(t), a data quality measuring device for measuring the quality of data of the user data signal, and circuitry for computing step up/down data based in part on the measured quality of data of the user data signal. The data signal rate converter is associated with the circuitry to provide rate data such that the circuitry computes step up/down data as a function of N(t)/M(t) whereby a change in the user data signal rate or the rate of the transmission data signal is compensated for in advance of a quality of data based adjustment associated with such data rate change.

The system also preferably includes a transmitter having a data signal rate convertor which converts the user data signal having rate N(t) into the transmission data signal having a faster rate M(t) by repeating selected data bits whereby the energy per bit to noise spectrum density ratio is increased in the transmission data signal.

In a preferred embodiment, the receiver has an interference measuring device for measuring the power of an interference signal received with the M(t) rate transmission data signal. The data quality measuring device outputs a nominal target SIR data based on relatively slowly collected received data quality data. The receiver circuitry computes the step up/down data by combining measured interference power data of the signal received from the transmitter with target signal to interference ratio SIR data which is computed by multiplying the nominal target SIR data by a factor N(t)/M(t) so that the target SIR data is quickly adjusted when a change in data rate occurs.

Other objects and advantages will be apparent to those of ordinary skill in the art based upon the following description of presently preferred embodiments of the invention.

BRIEF DESCRIPTION OF THE DRAWING(S)

DETAILED DESCRIPTION OF THE PREFERRED EMBODIMENT(S)

Conventional power control methods for wireless systems such as 3G PP utilize so-called inner and outer loops. The power control system is referred to as either open or closed dependent upon whether the inner loop is open or closed. The outer loops of both types of systems are closed loops.

Figure 1:
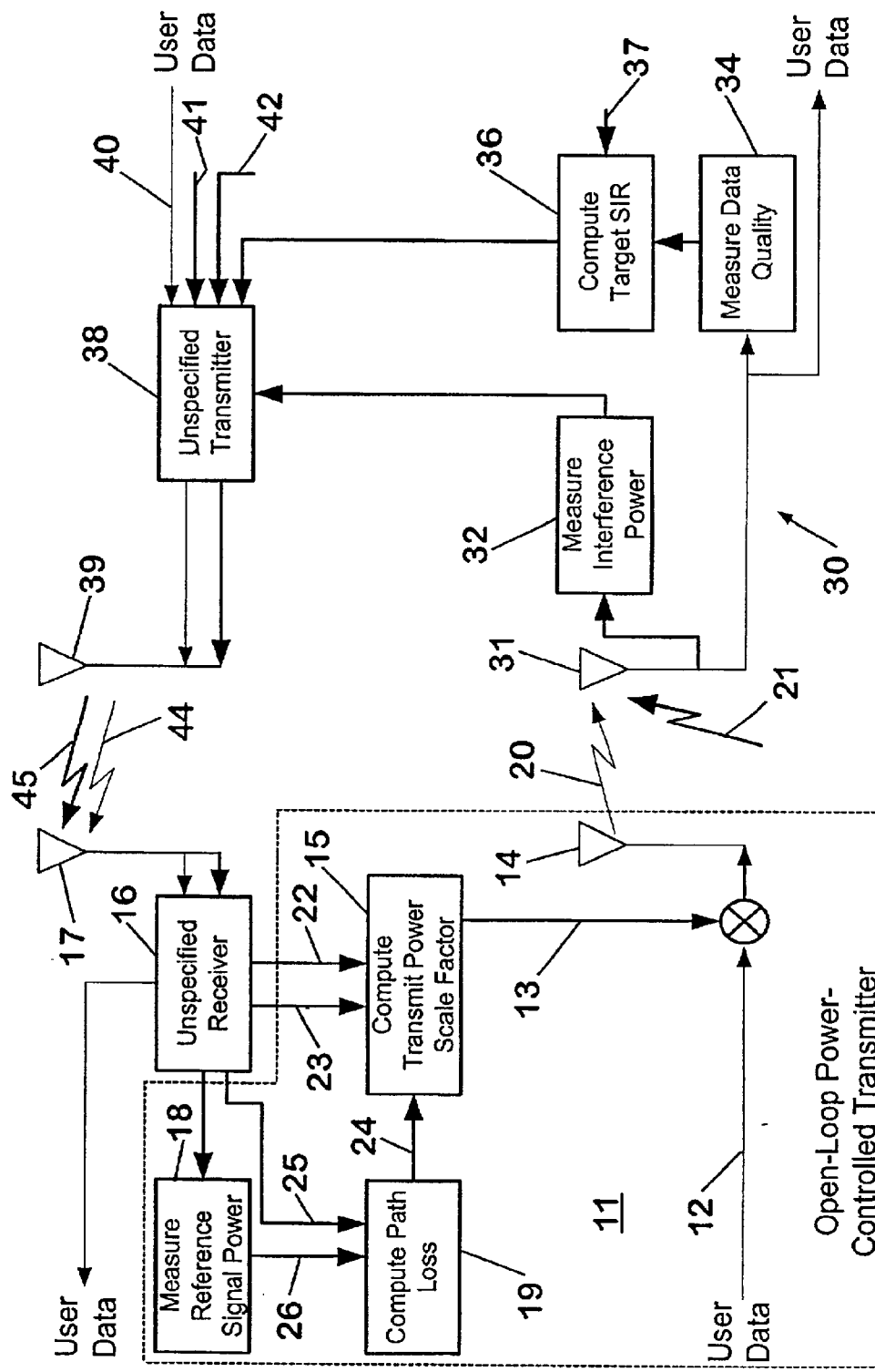
FIG. 1 is a schematic diagram of a conventional open loop power control system for single rate data wireless communication.

Pertinent portions of an open loop power control system having a "transmitting" communication station 10 and a "receiving" communication station 30 are shown in FIG. 1. Both stations 10, 30 are transceivers. Typically one is a base station and the other a type of user equipment UE. For clarity, only selected components are illustrated.

The transmitting station 10 includes a transmitter 11 having a data line 12 which transports a user data signal for transmission. The user data signal is provided with a desired power level which is adjusted by applying a transmit power scale factor from an output 13 of a processor 15 to adjust the transmission power level. The user data is transmitted from an antenna system 14 of the transmitter 11.

A wireless radio signal 20 containing the transmitted data is received by the receiving station 30 via a receiving antenna system 31. The receiving antenna system will also receive interfering radio signals 21 which impact on the quality of the received data. The receiving station 30 includes an interference power measuring device 32 to which the received signal is input which device 32 outputs measured interference power data. The receiving station 30 also includes a data quality measuring device 34 into which the received signal is also input which device 34 produces a data quality signal. The data quality measuring device 34 is coupled with a processing device 36 which receives the signal quality data and computes target signal to interference ratio (SIR) data based upon a user defined quality standard parameter received through an input 37.

The receiving station 30 also includes a transmitter 38 which is coupled with the interference power measuring device 32 and the target SIR generating processor 36. The receiving station's transmitter 38 also includes inputs 40, 41, 42 for user data, a reference signal, and reference signal transmit power data, respectively. The receiving station 30 transmits its user data and the control related data and references signal via an associated antenna system 39.

The transmitting station 10 includes a receiver 16 and an associated receiving antenna system 17. The transmitting station's receiver 16 receives the radio signal transmitted from the receiving station 30 which includes the receiving station's user data 44 and the control signal and data 45 generated by the receiving station 30.

The transmitting station processor 15 is associated with the transmitting station's receiver 16 in order to compute the transmit power scale factor. The transmitter 11 also includes a device 18 for measuring received reference signal power which device 18 is associated with path loss computing circuitry 19.

In order to compute the transmit power scale factor, the processor 15 receives data from a target SIR data input 22 which carries the target SIR data generated by the receiver station's target SIR generating processor 36, an interference power data input 23 which carries the interference data generated by the receiving station's interference power measuring device 32, and a path loss data input 24 which carries a path loss signal that is the output of the path loss computing circuitry 19. The path loss signal is generated by the path loss computing circuitry 19 from data received via a reference signal transmit power data input 25 which carries the reference signal transmit power data originating from the receiving station 30 and a measured reference signal power input 26 which carries the output of the reference signal power measuring device 18 of the transmitter 11. The reference signal measuring device 18 is coupled with the transmitting station's receiver 16 to measure the power of the reference signal as received from the receiving station's transmitter 38. The path loss computing circuitry 19 preferably determines the path loss based upon the difference between the known reference power signal strength conveyed by input 25 and the measured received power strength conveyed by input 26.

Interference power data, reference signal power data and target SIR values are signaled to the transmitting station 10 at a rate significantly lower than the time-varying rate of the propagation channel and interference. The "inner" loop is the portion of the system which relies on the measured interface. The system is considered "open loop" because there is no feedback to the algorithm at a rate comparable to the time-varying rate of the propagation channel and interference indicating how good the estimates of minimum required transmitter power are. If required transmit power level changes rapidly, the system cannot respond accordingly to adjust the scale factor in a timely manner.

With respect to the outer loop of the open loop power control system of FIG. 1, at the remote receiver station 30, the quality of the received data is evaluated via the measuring device 34. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) in processor 36 and an updated target SIR is then output. The updated target SIR is that value (in theory) which applied in the transmitter inner loop would cause the measured metric to converge to the desired value. Finally, the updated target SIR is passed, via the receiving station transmitter 38 and the transmitting station receiver 16, to the transmitter 11 for use in its inner loop. The update rate of target SIR is bounded by the time required to accumulate the quality statistic and practical limits on the signaling rate to the power-controlled transmitter.

Figure 2:
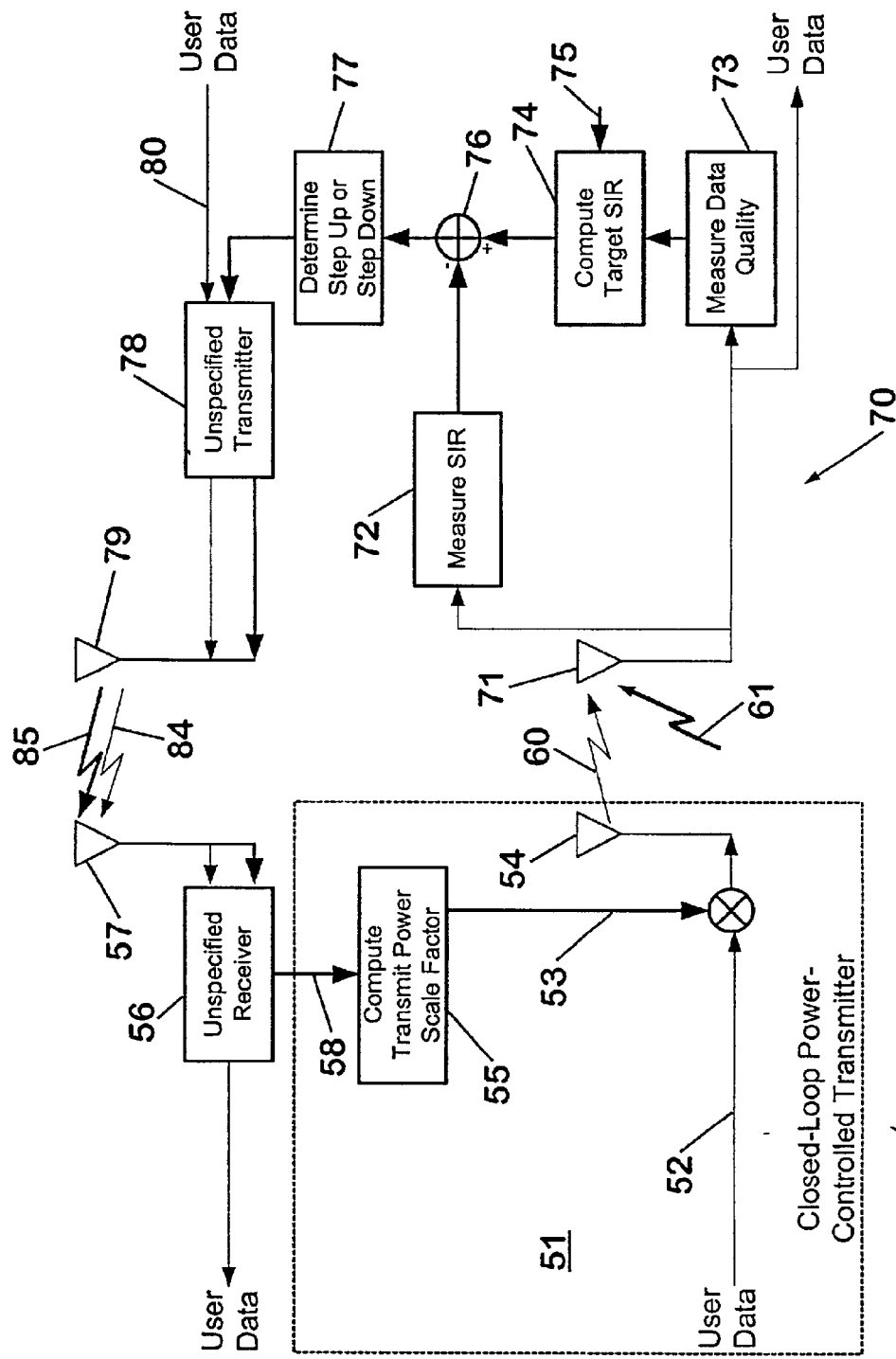
FIG. 2 is a schematic diagram of a conventional closed loop power control system for single rate data wireless communication.

With reference to FIG. 2, a communication system having a transmitting station 50 and a receiving station 70 which employs a closed loop power control system is illustrated.

The transmitting station 50 includes a transmitter 51 having a data line 52 which transports a user data signal for transmission. The user data signal is provided with a desired power level which is adjusted by applying a transmit power scale factor from an output 53 of a processor 55 to adjust the power level. The user data is transmitted via an antenna system 54 of the transmitter 51.

A wireless radio signal 60 containing the transmitted data is received by the receiving station 70 via a receiving antenna system 71. The receiving antenna system will also receive interfering radio signals 71 which impact on the quality of the received data. The receiving station 70 includes an interference power measuring device 72 to which the received signal is input which device 72 outputs measured SIR data. The receiving station 70 also includes a data quality measuring device 73 into which the received signal is also input which device 73 produces a data quality signal. The data quality measuring device 73 is coupled with a processor 74 which receives the signal quality data and computes target signal to interference ratio (SIR) data based upon a user defined quality standard parameter received through an input 75.

A combiner 76, preferably a substracter, compares the measured SIR data from the device 72 with the computed target SIR data from the processor 74, preferably by subtracting, to output an SIR error signal. The SIR error signal from the combiner 76 is input to processing circuitry 77 which generates step up/down commands based thereon.

The receiving station 70 also includes a transmitter 78 which is coupled with the processing circuitry 77. The receiving station's transmitter 78 also includes an input 80 for user data. The receiving station 70 transmits its user data and the control related data via an associate antenna system 79.

The transmitting station 50 includes a receiver 56 and an associated receiving antenna system 57. The transmitting station's receiver 56 receives the radio signal transmitted from the receiving station 70 which includes the receiving station's user data 84 and the control data 85 generated by the receiving station.

The transmitting station's scale factor processor 55 has an input 58 associated with the transmitting station's receiver 56. The processor 55 receives the up/down command signal through input 58 and computes the transmit power scale factor based thereon.

With respect to the inner loop of the closed loop power control system, the transmitting station's transmitter 51 sets its power based upon high-rate "step-up" and "step-down" commands generated by the remote receiving station 70. At the remote receiving station 70, the SIR of the received data is measured by the measuring device 72 and compared with a target SIR value generated by the processor 74 via combiner 76. The target SIR is that value (in theory) which, given that the data is received with that value, results in a desired quality of service. If the measured received SIR is less than the target SIR, a "step-down" command is issued by the processing circuitry 77, via the receiving station's transmitter 78 and the transmitting station's receiver 56, to the transmitter 51, otherwise a "step-up" command is issued. The power control system is considered "closed-loop" because of the high-rate feedback of the "step-up" and "step-down" commands which can react in real time to the time-varying propagation channel and interference. If required transmit power level changes due to time varying interference and propagation, it quickly responds and adjusts transmit power accordingly.

With respect to the outer loop of the closed loop power control system, the quality of the received data is evaluated in the receiving station 70 by the measuring device 73. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) by the processor 74 and an updated target SIR is then output. The updated target SIR is that value (in theory) which applied in the receiver algorithm would cause the measured metric to converge to the desired value. The updated target SIR is then used in the inner loop to determine the direction of the step up/down commands sent to the transmitting station's power scale generating processor 55 to control the power of the transmitter 51.

Figure 3:
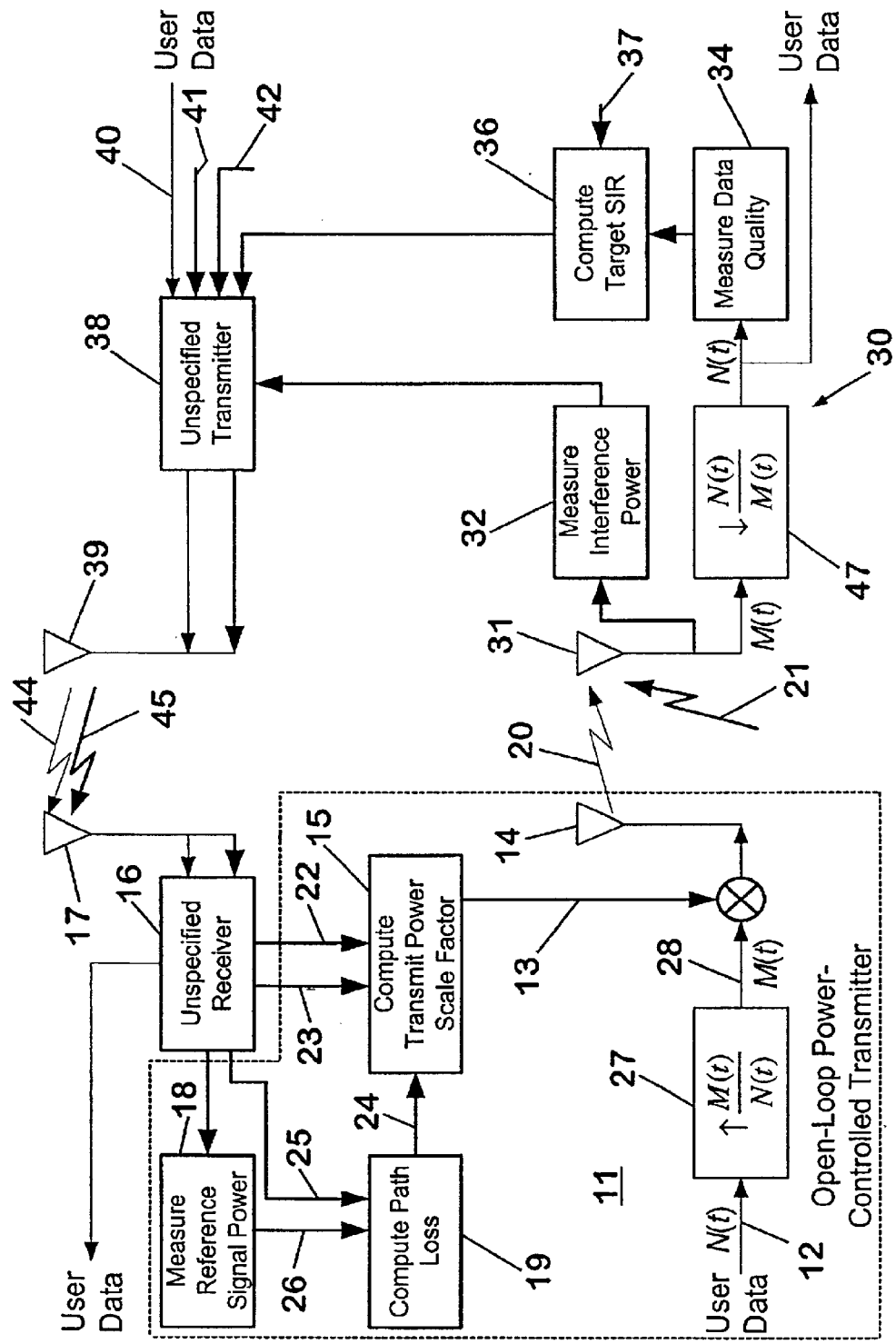
FIG. 3 is a schematic diagram of a conventional open loop power control system for variable multirate data wireless communication.
Figure 4:
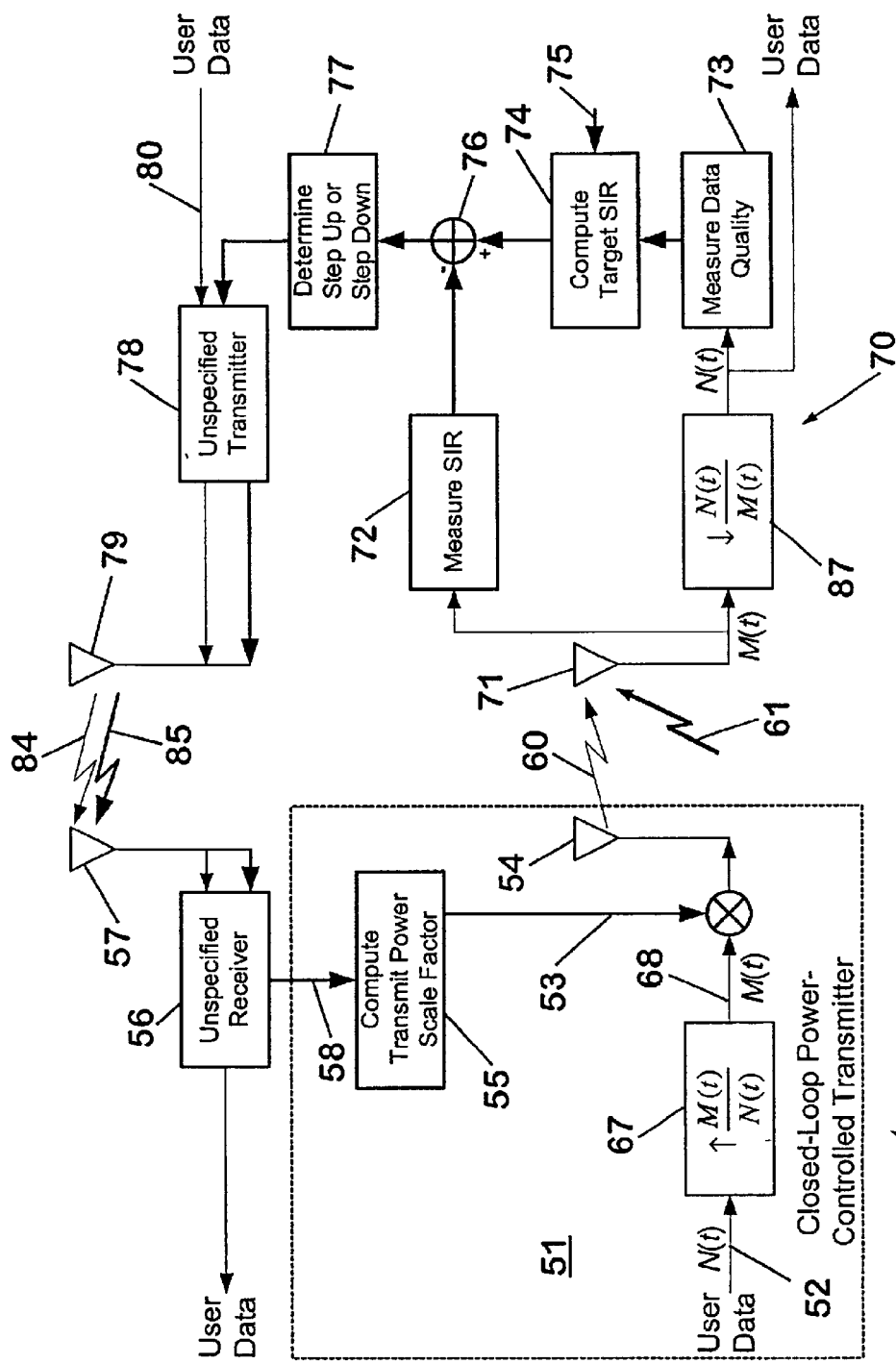
FIG. 4 is a schematic diagram of a conventional closed loop power control system for variable multirate data wireless communication.

FIGS. 1 and 2 illustrate power control systems for single rate data transmissions. However, in a digital communications system, data can be processed in blocks with a given bit rate and given block size, or alternatively, a given number of bits per block and given block rate. In such systems, for example, 3GPP FDD and TDD systems, more than one data rate can exist at any given time within the communications system, and such data rates can vary over time. FIG. 3 illustrates a modified open-loop power control system and FIG. 4 illustrates a modified closed-loop power control system for wireless systems which communicate multiple data channels having variable data rates.

To accommodate multichannel variable rate data transmission, the open loop power control system illustrated in FIG. 1 is modified, as shown in FIG. 3, to include an up converter 27 in the transmitting station 10 and a down converter 47 in the receiving station 30.

The user data for transmission is combined into a signal having a data rate N(t). The data stream having the rate N(t) is converted to a data stream having a higher rate M(t) by data up converter 27 which has an output 28 which carries the transmission data signal having the rate M(t).

At the receiving station 30, the user data signal having the rate M(t) is received and down converted by the converter 47 to the original rate N(t). The interference power measuring device 32 measures the interference of the signal as received with its higher M(t) rate. The data quality measuring device 34 is coupled to the user data path down stream the converter 47 and measures the quality of the data after it has been down converted to the N(t) rate.

To accommodate multichannel variable rate data transmission, the closed loop power control system illustrated in FIG. 2 is modified, as shown in FIG. 4, to include an up converter 67 in the transmitting station 50 and a down converter 87 in the receiving station 70. The user data for transmission is combined into a signal having a data rate N(t). The data stream having the rate N(t) is converted to a data stream having a higher rate M(t) by data up converter 67 which has an output 68 which carries the transmission data signal having the rate M(t).

At the receiving station 70, the user data signal having the rate M(t) is received and down converted by the converter 87 to the original rate N(t). The interference power measuring device 72 measures the interference of the signal as received with its higher M(t) rate. The data quality measuring device 73 is coupled to the user data stream down stream the converter 87 and measures the quality of the data after it has been down converted to the N(t) rate.

In both types of multichannel variable rate systems, the user data input to the transmitter 11, 51 for transmission to the remote receiver 30, 70 has the data rate denoted N(t) and the user data output from the remote receiver is at that same rate. Data rate N(t) can be the composite of several data rates of different data channels which have been multiplexed for transmission over a common bearer. That N is a function of (t) indicates that the rate may vary, that is, be different from time to time, or from block to block. Reasons for this variation include the addition and/or deletion of data channels and actual data rate changes in existing channels, as is typical for packet services.

Also in both systems, illustrated in FIGS. 3 and 4, in the transmit data path, the date rate is changed from N(t) to M(t) and change back to N(t) in the remote receiver. Data rate N(t) is the user data rate and the data rate M(t) is over-the-air data rate, which can be quite independent of each other.

In a 3GPP TDD system, for example, M(t) is the number of bits per 10 msec. frame in a given number of time slots and orthogonal variable spreading factor codes at given spreading factors. That M is a function of (t) indicates that the rate may vary, that is, be different from time to time, or more specifically, from frame-to-frame. Varying M is equivalent to varying the spreading factors and/or number of physical channels used per frame, varying N is equivalent to a data rate change in one or more transport channels. Rate M(t) is equivalent to $N_{dataj}$ bits per 10 msec. frame and N(t) is equivalent to $$PL \cdot 1 / RM_{\min} \sum_{TrCHi} RM_i \cdot N_{ij}$$

bits per 10 msec. frame, during the time t when TFCj is in effect, where, as defined in 3GPP:

$N_{ij}$ is the number of bits in a radio frame before rate matching on TrCH i with transport format combination j.

$RM_i$ is the semi-static rate matching attribute for TrCH i which is signaled from higher layers.

PL is the puncturing limit which value limits the amount of puncturing that can be applied in order to minimize the number of physical channels and is signaled from higher layers.

$N_{dataj}$ is the total number of bits that are available for a coded composite TrCH in a radio frame with transport format combination j.

$TF_i(j)$ is the transport format of TrCH i for the transport format combination j.

TB or Transport Block is defined as the basic data unit exchanged between L1 and MAC. An equivalent term for Transport Block is "MAC PDU".

TBS or Transport Block Set is defined as a set of Transport Blocks that is exchanged between Layer 1 and MAC at the same time instance using the same Transport Channel.

TrCH or Transport Channel are the channels offered by the physical layer to Layer 2 for data transport between peer Layer 1 entities are denoted. Different types of Transport Channels are defined by how and with which characteristics data is transferred on the physical layer, e.g. whether using dedicated or common physical channels.

TF or Transport Format is defined as a format offered by Layer 1 to MAC for the delivery of a Transport Block Set during a Transmission Time Interval on a Transport Channel. The Transport Format constitutes of two parts—one dynamic part and one semi-static part.

TFC or Transport Format Combination is defined as the combination of currently valid Transport Formats on all Transport Channels, i.e. containing one Transport Format from each Transport Channel.

TFCS or Transport Format Combination Set is defined as a set of Transport Format Combinations.

MAC or Medium Access Control is a sub-layer of radio interface Layer 2 providing unacknowledged data transfer service on logical channels and access to Transport Channels.

PDU or Protocol Data Unit is a unit of data specified in an (N)-protocol layer and consisting of (N)-protocol control information and possibly (N)-user data.

The conversion from rate N(t) to rate M(t) is performed in the transmitting station 10, 50 in the converter 26, 67 which indicates up-conversion by the factor M(t)/N(t). The conversion rate from rate M(t) back to rate N(t) is performed in the remote receiving station 30, 70 in the converter 47, 87 which indicates down-conversion by the factor N(t)/M(t).

In both systems illustrated in FIGS. 3 and 4, rate M(t) is shown to be higher than rate N(t). This is deliberate. An unintended effect of the upward rate conversion, mitigation of which is an object of the invention, occurs only for case of up-conversion by repetition in the transmitter, which is described below. This effect does not happen if N(t)=M(t) and the effect is different if N(t), M(t) which is not the subject of this invention.

Figure 5:
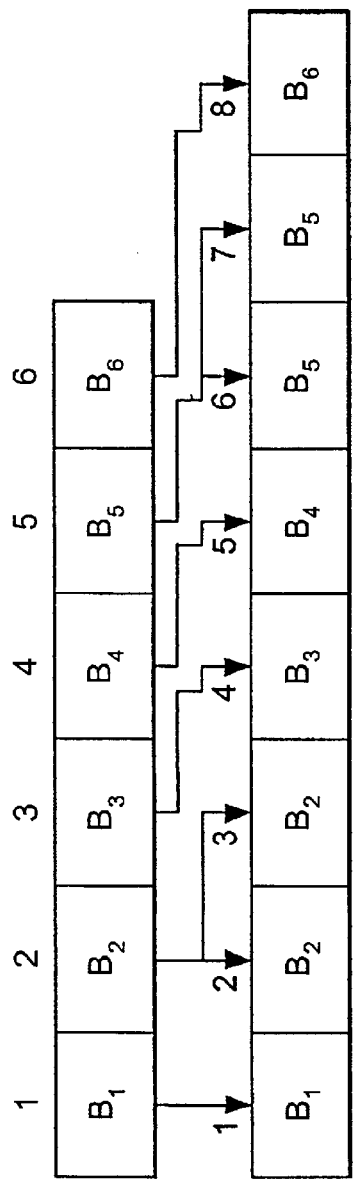
FIG. 5 is a block diagram of data rate up-conversion from 6 to 8 bits per block using repetition.
Figure 6:
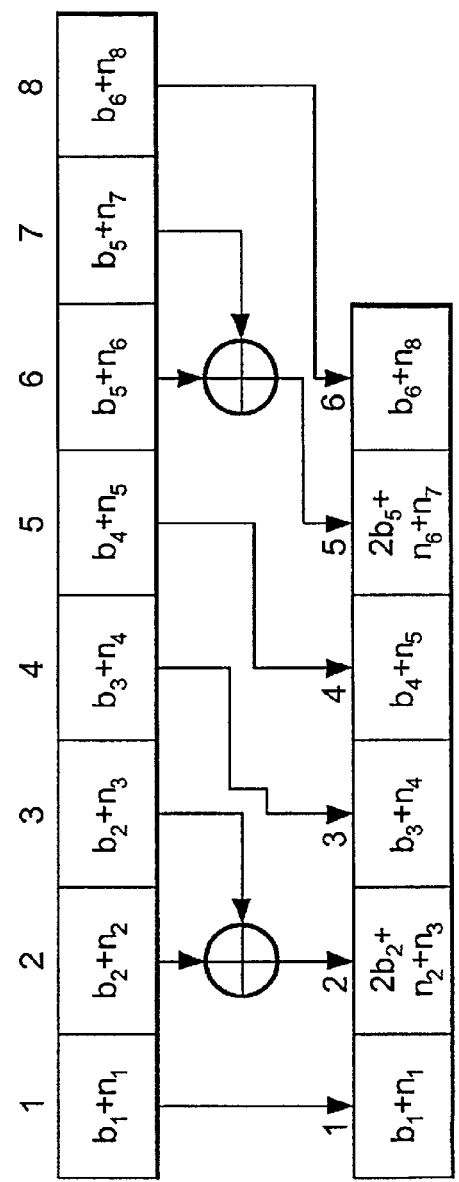
FIG. 6 is a block diagram of data rate down-conversion of repeated data from 8 to 6 bits per block.

Up-conversion of a data rate can be implemented by repetition, that is, repeating selected bits in a rate N block until it contains the same number of bits as a block at rate M and to perform down-conversion by numerically combing the received repeated "soft" bits. Up-conversion by repetition is illustrated in an example shown in FIG. 5, where $B_i$ is the $i^{th}$ "hard" bit, that is ±1, in the input sequence, for the simplified case of increasing the data rate from six to eight bits per block. In the example, two bits, 2 and 5, are repeated, changing the block size from six to eight. In FIG. 6, where $b_i+n_j$ is a "soft" bit, that is, a digital sample within the receiver of the transmitted bit $B_i$ plus noise component $n_j$ at time j, the down-conversion process, with input consisting of eight "soft" bits is illustrated. Received "soft" bits 2 and 3 are numerically summed to form a scaled version of the original bits 2 and 3; similarly, received "soft" bits 6 and 7 are numerically summed to form a scaled version of the original bit 5.

The particular repeated bits used in the example represent uniform distribution of repeated bits, which, in conjunction with an interleaver, is a particular scheme used in a 3GPP system. However, the choice of bits to repeat is not germane to the invention.

The above-described method of data rate conversion is a component of so-called "rate matching" using repetition functions used in the 3GPP TDD and FDD systems. It has the advantage, over the simplistic method of sending (two, in the example) dummy bits to change the data rate, in that the energy difference between the original shorter and transmitted longer block can be exploited to improve signal quality. To illustrate, in the example, received bits 2 and 5 have twice the energy per bit noise spectrum density ratio (Eb/No) of the other received bits. This results in an overall improvement of bit error and block error rates of the received data as compared to what those quality metrics would have been had the bits not been repeated and two dummy bits been sent instead. Of course, eight units of energy were used to transmit data only requiring six units of energy. There are as a result the effect of the unintended but consequential increased transmission energy and the effect of improved received data quality. Those effects are addressed by the present invention.

The open and closed power control systems shown in FIGS. 3 and 4 for variable multirate data are virtually the same as those shown in FIGS. 1 and 2 for single rate data. FIG. 3 and FIG. 4 represent open and closed power control systems for a 3GPP TDD communication system. However, both the open and closed loop power control systems are less than optimal in addressing the effects of rate changes for variable multirate data.

In the open loop system of FIG. 3, with N(t) equal to M(t) in the steady state and ignoring the variance of a fading channel or any variable interference, the target SIR will settle at a quiescent point yielding the desired data quality. This condition is equivalent to the single rate example of FIG. 1. In a multiple channel variable rate system, however, at some time, t, N, and/or M changes. As described above, where this results in an improvement to the measured data quality metric, more energy than is actually required is transmitted. The outer loop, which operates at a relatively low rate, will eventually detect the improved signal quality and then lower the target SIR for the inner loop to reduce transmitter power to compensate for what it perceives as too-high signal quality. In the meantime, the transmitter 11 will be using more energy than is actually necessary to transmit the data (to have it received with the required quality). In the case of an open loop power controlled transmit station being a battery powered mobile unit (as can be the case in a 3GPP system), unnecessary battery power is expended.

Figure 7:
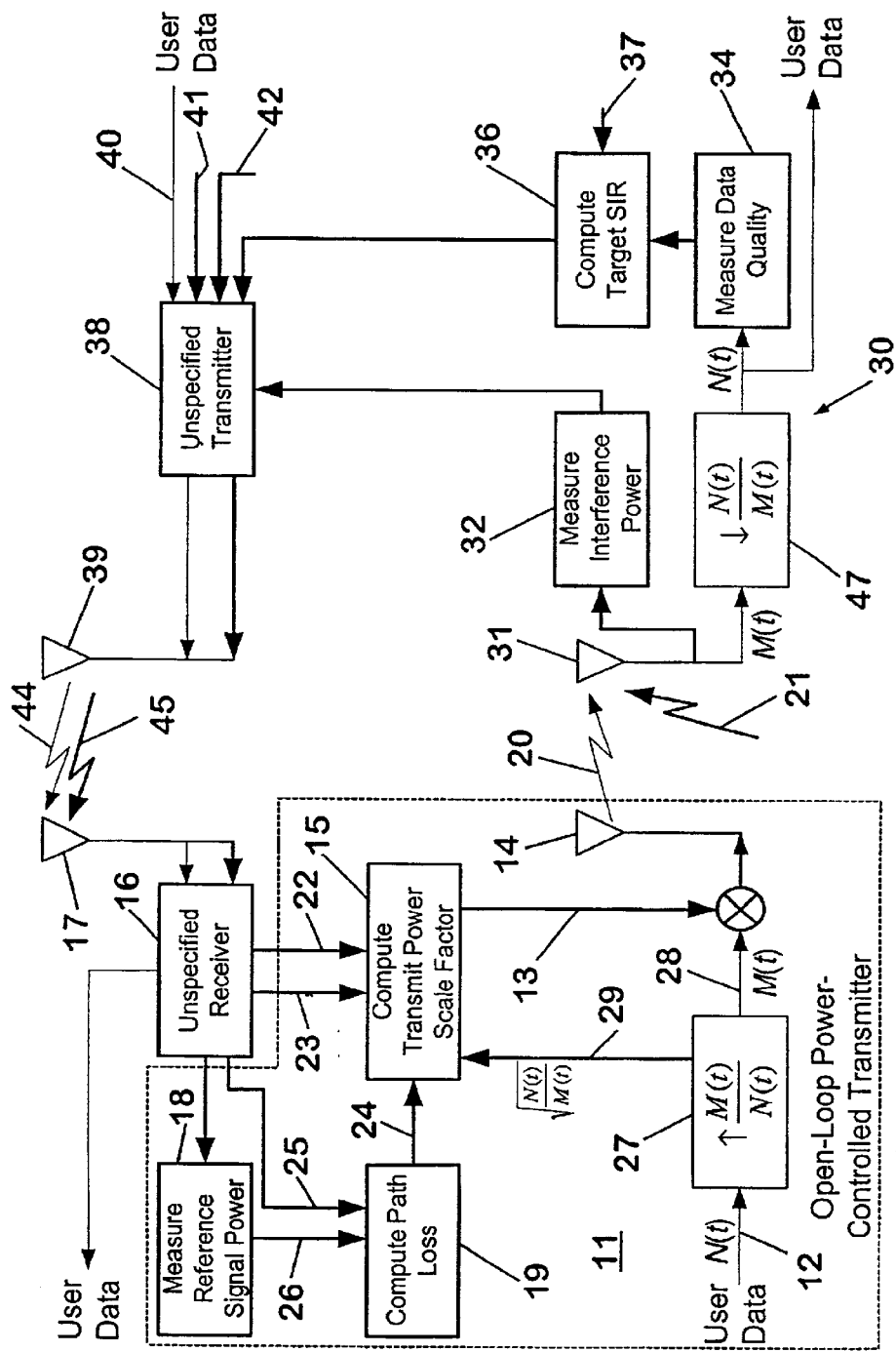
FIG. 7 is a schematic diagram of a fast adaptive open loop power control system for variable multirate data wireless communication made in accordance with the teaching of the present invention.

The invention as it applies to open loop power control for variable multirate data is illustrated in FIG. 7 where corresponding elements are identified with the same reference numbers as in FIG. 3. As shown in FIG. 7, the transmitting station's converter 27 provides an additional input 29 to the scale factor generating processor 15. Though input 29, the converter provides a signal equivalent to $\sqrt{(N(t)/M(t))}$ to the processor 15 as a factor in calculating the transmit power scale factor. Accordingly, when the modified scale factor is applied to the transmitted data, it causes the transmit power to be adjusted by the factor of:

$$N(t)/M(t)$$

to immediately compensate for the rate change in N(t) or M(t).

This modified scale factor is applied in the same manner as is the conventional scale factor that sets transmitter power, which is derived from:

$$P_{TS} = SIR_{TARGET} + I_{RS} + \alpha(L-L_0) + L_0 + \text{CONSTANT VALUE} \quad \text{Equation 1}$$

where the additive terms represent multiplicative factors expressed in dB. As a practical matter, the additional factor used in generating the scale factor becomes simply another term in the above equation, which in the above form becomes:

$$P_{TS} = SIR_{TARGET} + I_{RS} + \alpha(L-L_0) + L_0 + \text{CONSTANT VALUE} + N(t)/M(t) \quad \text{Equation 2}$$

where:

$P_{TS}$ is the transmitting station's transmission power level in decibels.

$SIR_{TARGET}$ is determined in the receiving station.

$I_{RS}$ is the measure of the interference power level at the receiving station.

L is the path loss estimate in decibels for the most recent time slot for which the path loss was estimated.

$L_0$, the long term average of the path loss in decibels, is the running average of the pathloss estimate, L.

CONSTANT VALUE is a correction term. The CONSTANT VALUE corrects for differences in the uplink and downlink channels, such as to compensate for differences in uplink and downlink gain. Additionally, the CONSTANT VALUE may provide correction if the transmit power reference level of the receiving station is transmitted, instead of the actual transmit power.

α is a weighting value which is a measure of the quality of the estimated path loss and is, preferably, based on the number of time slots between the time slot of the last path loss estimate and the first time slot of the communication transmitted by the transmitting station. The value of α is between zero and one. Generally, if the time difference between the time slots is small, the recent path loss estimate will be fairly accurate and α is set at a value close to one. By contrast, if the time difference is large, the path loss estimate may not be accurate and the long term average path loss measurement is most likely a better estimate for the path loss. Accordingly, α is set at a value closer to one. Equations 3 and 4 are equations for determining α.

$$\alpha = 1 - (D-1)/(D_{max} - 1) \quad \text{Equation 3}$$

$$\alpha = max\{1 - (D-1)/(D_{max-allowed} - 1), 0\} \quad \text{Equation 4}$$

where the value, D, is the number of time slots between the time slot of the last path loss estimate and the first time slot of the transmitted communication which will be referred to as the time slot delay. If the delay is one time slot, α is one. $D_{max}$ is the maximum possible delay. A typical value for a frame having fifteen time slots is seven. If the delay is $D_{max}$, α is zero $D_{max-allowed}$ is the maximum allowed time slot delay for using open loop power control. If the delay exceeds $D_{max-allowed}$, open loop power control is effectively turned off by setting α=0.

As the data rates N(t) and M(t) change from time-to-time, the inventive system of FIG. 7 compensates for the change in required power, as opposed to waiting for a revised target SIR to be determined by the outer loop to compensate for the data rate change. Thus, for open loop power control, the invention virtually eliminates the period of time when the transmitted signal is sent with excess power due to a data rate change.

With respect to the closed loop system of FIG. 4 with N(t) equal to M(t) in the steady state, ignoring the variance of a fading channel or any variable interference, the target SIR will settle at a quiescent point yielding the desired data quality. This is the equivalent of the single rate system of FIG. 2. With variable multirate, however, at some time t, N and/or M changes. As described above, where this results in an improvement to the measured data quality metric, more energy than is actually required is transmitted. However, the measured SIR does not change with changes in N and M, because the SIR is measured before the down-conversion with it concomitant increase in Eb/No (or SIR) per repeated bit. Since the outer loop operates at a relatively low rate, in the short term, the power control commands sent back to the transmitter will no longer be accurate. However, eventually the outer loop will detect the improved signal quality and compute a lower target SIR for the inner loop to compensate for what it perceives as too-high signal quality. When that happens, this too-low target SIR will downward bias the step up/down decisions and thus reduce transmitter power. This in turn will result in below-required signal quality at the receiver. Eventually, the outer loop will respond to the degraded signal quality with a higher target SIR, and in the steady state the system will eventually converge to the correct power level. Until then, the received signal will be degraded.

Figure 8:
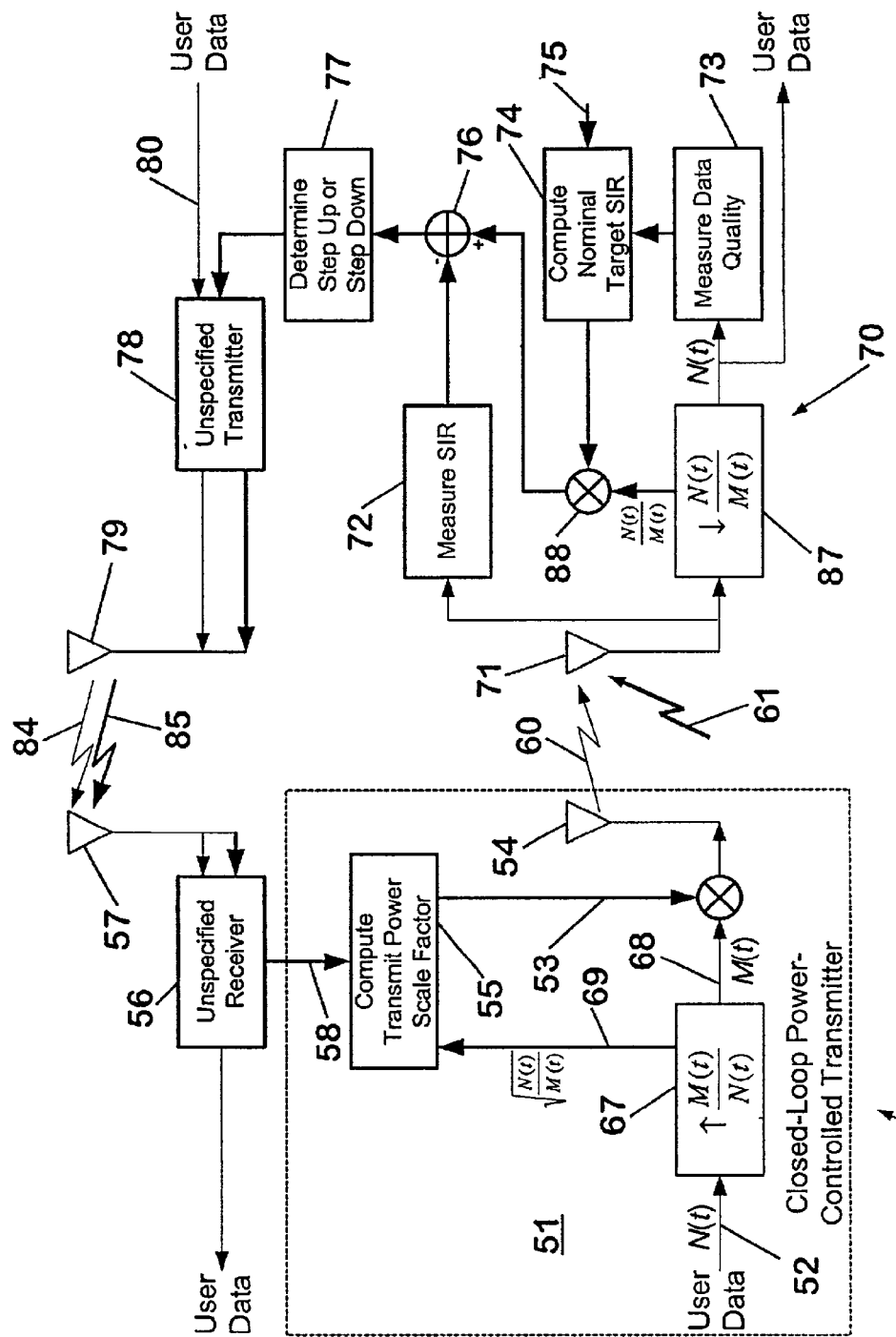
FIG. 8 is a schematic diagram of a fast adaptive closed loop power control system for variable multirate data wireless communication made in accordance with the teaching of the present invention.

FIG. 8 illustrates the invention as it applies to a closed loop power control system for variable multirate data where corresponding elements have the same reference numerals as in FIG. 4. In the transmitter 51 of the transmitting station 50, the converter 67 provides an additional input 69 to the scale factor generating processor 55. The converter provides a signal equivalent to $\sqrt{(N(t)/M(t))}$ so that the scale factor output by the processor 55 via output 53 is a function of N(t)/M(t) as described above in connection with the open loop system of FIG. 7.

In the receiver, the converter 87 outputs a signal equivalent to N(t)/M(t) to a combiner 88, preferably a multiplier. The output of the target SIR processor 74 is diverted to the combiner 88. The combiner 88 combines the rate change data from the converter 87 and the target SIR data from the processor 74 and outputs an adjusted target SIR to the combiner 76.

Through this configuration, the processor 74 effectively outputs a nominal target SIR. By applying the factor N(t)/M(t) to the nominal target SIR determined from the measured signal quality, a more rapid response is made to compensate or adjust for a change received power due to a data rate change.

As data rates N(t) and M(t) change from time-to-time, the system of FIG. 8 rapidly compensates for the change in required power in the transmitter and the changed expected received signal strength in the receiver, as opposed to waiting for the outer loop to compensate for the data rate change. Thus, for closed loop power control system of FIG. 8 the period of time when the received signal is received below acceptable quality due to a data rate change is reduced.

Although various components have been identified separately within the respective transmitting and receiving stations, those of ordinary skill in the art will recognize that various elements can be combined. For example, combiner 88 of the system of FIG. 8 can be embodied in a single processor with processor 74. Other variations and modifications consistent with the invention will be recognized by those of ordinary skill in the art.

What is claimed is:

1. A method of controlling transmitter power in a wireless communication system which combines multiple channels of user data at independent rates, at least one of which varies over time, into a signal having a rate N(t) where N(t) is a function of the rates of the multiple channels which are combined for transmission, in which the combined multichannel signal having rate N(t) is converted into a transmission data signal having a faster rate M(t) for transmission by a transmitter and in which the transmission power is adjusted on a relatively slow basis based on quality of data received by a receiver of the transmitted data characterized by:

determining the transmitter scale factor as a function of N(t)/M(t) such that a change in the data rate in the multiple channels or the rate of the transmission data signal is compensated in advance of a quality of data based adjustment associated with such data rate change.

2. The method of claim 1 wherein transmitter power is controlled by an open loop system where the transmitter:

receives from the receiver a reference signal, reference signal power data, measured interference power data, and target signal to interference ratio (SIR) data which SIR data is based on relatively slowly collected received signal quality data, measures the reference signal to determine received reference signal power, computes a path loss based on the received reference signal power data and the determined reference signal power, and computes the scale factor based on the computed path loss, the received measured interference power data, the target SIR data and $\sqrt{(N(t)/M(t))}$.

3. The method of claim 2 wherein the combined multichannel signal having rate N(t) is converted into the transmission data signal having the faster rate M(t) by repeating selected data bits whereby the energy per bit to noise spectrum density ratio is increased in the transmission data signal.

4. The method of claim 1 wherein transmitter power is controlled by a closed loop system where the transmitter utilizes step up/down data generated by the receiver and computes the scale factor based on the step up/step down data and $\sqrt{(N(t)/M(t))}$.

5. The method of claim 4 wherein the combined multichannel signal having rate N(t) is converted into the transmission data signal having the faster rate M(t) by repeating selected data bits whereby the energy per bit to noise spectrum density ratio is increased in the transmission data signal.

6. The method of claim 4 wherein the step up/down data is generated by the receiver by combining measured interference power data of the signal received from the transmitter with target signal to interference ratio (SIR) data based at least in part on relatively slowly collected received signal quality data.

7. The method of claim 6 wherein the target SIR data is computed by multiplying a nominal target SIR data based on relatively slowly collected received signal quality data by a factor N(t)/M(t) so that the target SIR data is quickly adjusted when a change in data rate occurs.

8. The method of claim 7 wherein the combined multichannel signal having rate N(t) is converted into the transmission data signal having the faster rate M(t) by repeating selected data bits whereby the energy per bit to noise spectrum density ratio is increased in the transmission data signal.

9. The method of claim 1 wherein the combined multichannel signal having rate N(t) is converted into the transmission data signal having the faster rate M(t) by repeating selected data bits whereby the energy per bit to noise spectrum density ratio is increased in the transmission data signal.

10. A transmitter for a wireless communication system which combines multiple channels of user data at independent rates, at least one of which varies over time, into a signal having a rate N(t) where N(t) is a function of the rates of the multiple channels which are combined for transmission, in which the combined multichannel signal having rate N(t) is converted into a transmission data signal having a faster rate M(t) for transmission and in which transmission power is adjusted on a relatively slow basis by applying a scale factor to the transmitter power based on quality of data received by a receiver of the transmitted data, the transmitter including a data signal rate converter which increase the data rate of combined multiple channel data N(t) to a higher data transmission rate M(t) and a processor for computing a transmission power scale factor based in part on data generated by the receiver related to quality of data received characterized in that said data signal rate converter is associated with said processor such that said processor computes the transmission power scale factor as a function of N(t)/M(t) whereby a change in the data rate in the multiple channels or the rate of the transmission data signal are compensated in connection with real time transmission in advance of a receiver quality of data based adjustment associated with such data rate changes.

11. The transmitter of claim 10 wherein said data signal rate converter converts the combined multichannel signal having rate N(t) into the transmission data signal having the faster rate M(t) by repeating selected data bits whereby the energy per bit to noise spectrum density ratio is increased in the transmission data signal.

12. The transmitter of claim 10 having an open loop power control system where the transmitter receives from the receiver of the transmitted data: a reference signal, reference signal power data, measured interference power data, and target signal to interference ratio (SIR) data which SIR data is based on relatively slowly collected received signal quality data, further characterized by:

a signal measuring device which measures received reference signal power, path loss processing circuitry for computing a path loss based on the received reference signal power data and the measured received reference signal power, and said processor computes the transmission power scale factor based on the computed path loss, the received measured interference power data, the target SIR data and $\sqrt{(N(t)/M(t))}$.

13. The transmitter of claim 12 wherein said data signal rate converter converts the combined multichannel signal having rate N(t) into the transmission data signal having the faster rate M(t) by repeating selected data bits whereby the energy per bit to noise spectrum density ratio is increased in the transmission data signal.

14. The transmitter of claim 10 having a closed loop power control system where the transmitter receives step up/down data from the receiver of the transmitted data wherein said processor computes the transmission power scale factor based on the received step up/step down data and $\sqrt{(N(t)/M(t))}$.

15. The transmitter of claim 14 wherein said data signal rate converter converts the combined multichannel signal having rate N(t) into the transmission data signal having the faster rate M(t) by repeating selected data bits whereby the energy per bit to noise spectrum density ratio is increased in the transmission data signal.

16. A method of controlling transmitter power in a wireless communication system which combines multiple channels of user data at independent rates, at least one of which varies over time, into a signal having a rate N(t) where N(t) is a function of the rates of the multiple channels which are combined for transmission, in which the combined multichannel signal having rate N(t) is converted into a transmission data signal having a faster rate M(t) for transmission by a transmitter and in which the transmission power is adjusted on a relatively slow basis based on quality of data received by a receiver of the transmitted data characterized by:

determining the transmitter scale factor as a function of N(t)/M(t) such that a change in the data rate in the multiple channels or the rate of the transmission data signal is compensated in advance of a quality of data based adjustment associated with such data rate change.

17. The method of claim 16 wherein the combined multichannel signal having rate N(t) is converted into the transmission data signal having the faster rate M(t) by repeating selected data bits whereby the energy per bit to noise spectrum density ratio is increased in the transmission data signal.

18. A method of controlling transmitter power in a wireless communication system in which user data is processed as a multirate signal having a rate N(t) where N(t) is a function of time, in which the user data signal having rate N(t) is converted into a transmission data signal having a faster rate M(t) for transmission and in which transmitter power is controlled by a closed loop system where the transmission power is adjusted by applying a scale factor in response to step up/down data generated by a receiver of the transmitted data, the step up/down data being based in part on relatively slowly collected quality of data received by characterized by:

determining step up/down data as a function of N(t)/M(t) such that a change in the user data signal rate or the data rate of the transmission data signal is compensated for in advance of a quality of data based adjustment associated with such a data rate change.

* * * * *

UNITED STATES PATENT AND TRADEMARK OFFICE
CERTIFICATE OF CORRECTION

PATENT NO.    : 6,832,096 B2
DATED         : December 14, 2004
INVENTOR(S)   : John W. Haim It is certified that error appears in the above-identified patent and that said Letters Patent is hereby corrected as shown below:

Title page,
Item [56], References Cited, U.S. PATENT DOCUMENTS, delete "2002/0144019 A1 10/2002 Nelson et al." and insert therefor -- 2003/0144019 A1 7/2003 Nelson et al. --. FOREIGN PATENT DOCUMENTS, delete "WO 97/18643 A 5/1997" and insert therefor -- WO 9718643 A 5/1997 --.

Column 7,
Line 53, after the word "stream", insert -- from --.

Column 8,
Line 4, after the word "stream", insert -- from --.
Line 19, after the word "the", delete "date" and insert therefor -- data --.
Line 20, after the word "and", delete "change" and insert therefor -- changed --.
Line 62, after the word "entities", delete "are denoted".

Column 9,
Line 2, after the word "Format", delete "constitutes" and insert therefor -- is composed --.
Line 29, after the word "N(t)", delete "," and insert therefor -- > --.
Line 34, after the word "numerically", delete "combing" and insert therefor -- combining --.

Column 11,
Line 35, after the word "zero", insert -- and --.
Line 58, after the word "with", delete "it" and insert therefor -- its --.

UNITED STATES PATENT AND TRADEMARK OFFICE
CERTIFICATE OF CORRECTION

PATENT NO.    : 6,832,096 B2
DATED         : December 14, 2004
INVENTOR(S)   : John W. Haim It is certified that error appears in the above-identified patent and that said Letters Patent is hereby corrected as shown below:

Column 12,
Line 26, after the word "change", insert -- in --.

Signed and Sealed this

Twenty-second Day of February, 2005

JON W. DUDAS
*Director of the United States Patent and Trademark Office*